(12) United States Patent
Hiroe

(10) Patent No.: US 10,967,746 B2
(45) Date of Patent: Apr. 6, 2021

(54) VEHICLE

(71) Applicant: Toyota Jidosha Kabushiki Kaisha, Toyota (JP)

(72) Inventor: Yoshihiko Hiroe, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 135 days.

(21) Appl. No.: 16/231,680

(22) Filed: Dec. 24, 2018

(65) Prior Publication Data

US 2019/0225096 A1    Jul. 25, 2019

(30) Foreign Application Priority Data

Jan. 22, 2018  (JP) .............................. JP2018-008331

(51) Int. Cl.

| | | |
|---|---|---|
| *B60L 50/60* | (2019.01) | |
| *B60L 53/22* | (2019.01) | |
| *H02J 7/00* | (2006.01) | |
| *B60L 53/10* | (2019.01) | |
| *B60L 58/21* | (2019.01) | |
| *B60L 53/14* | (2019.01) | |

(52) U.S. Cl.
CPC ............. *B60L 50/66* (2019.02); *B60L 53/11* (2019.02); *B60L 53/14* (2019.02); *B60L 53/22* (2019.02); *B60L 58/21* (2019.02); *H02J 7/0024* (2013.01)

(58) Field of Classification Search
CPC .......... B60L 50/66; B60L 53/11; B60L 58/21; B60L 53/14; B60L 53/22; B60L 53/16; H02J 7/0024; Y02T 10/7072; Y02T 90/14; Y02T 10/70
USPC .......................................................... 701/22
See application file for complete search history.

(56) References Cited

U.S. PATENT DOCUMENTS

| | | |
|---|---|---|
| 2013/0088197 A1 | 4/2013 | Kim et al. |
| 2016/0001664 A1* | 1/2016 | Roth ....................... B60L 58/19 |
| | | 318/139 |
| 2016/0006377 A1 | 1/2016 | Hashimoto |
| 2019/0100111 A1* | 4/2019 | Liu ......................... B60L 58/21 |

FOREIGN PATENT DOCUMENTS

| | | | |
|---|---|---|---|
| EP | 2765670 A1 | | 8/2014 |
| JP | H03-203501 A | | 1/1991 |
| JP | 2007-098981 A | | 1/2007 |
| JP | 2010-023636 A | | 2/2010 |
| JP | 2014-003872 A | * | 1/2014 |
| JP | 5691981 B2 | | 4/2015 |
| JP | 2016-013819 A | | 1/2016 |

* cited by examiner

*Primary Examiner* — Brian P Sweeney
(74) *Attorney, Agent, or Firm* — Dinsmore & Shohl LLP

(57) ABSTRACT

A vehicle includes a battery pack including battery stacks and switching relays, and charging ports that are respectively connected to the battery stacks. The switching relays are configured to switch between a first state where the battery stack and the battery stack are electrically connected to each other, and a second state where the battery stack and the battery stack are electrically disconnected from each other.

11 Claims, 6 Drawing Sheets

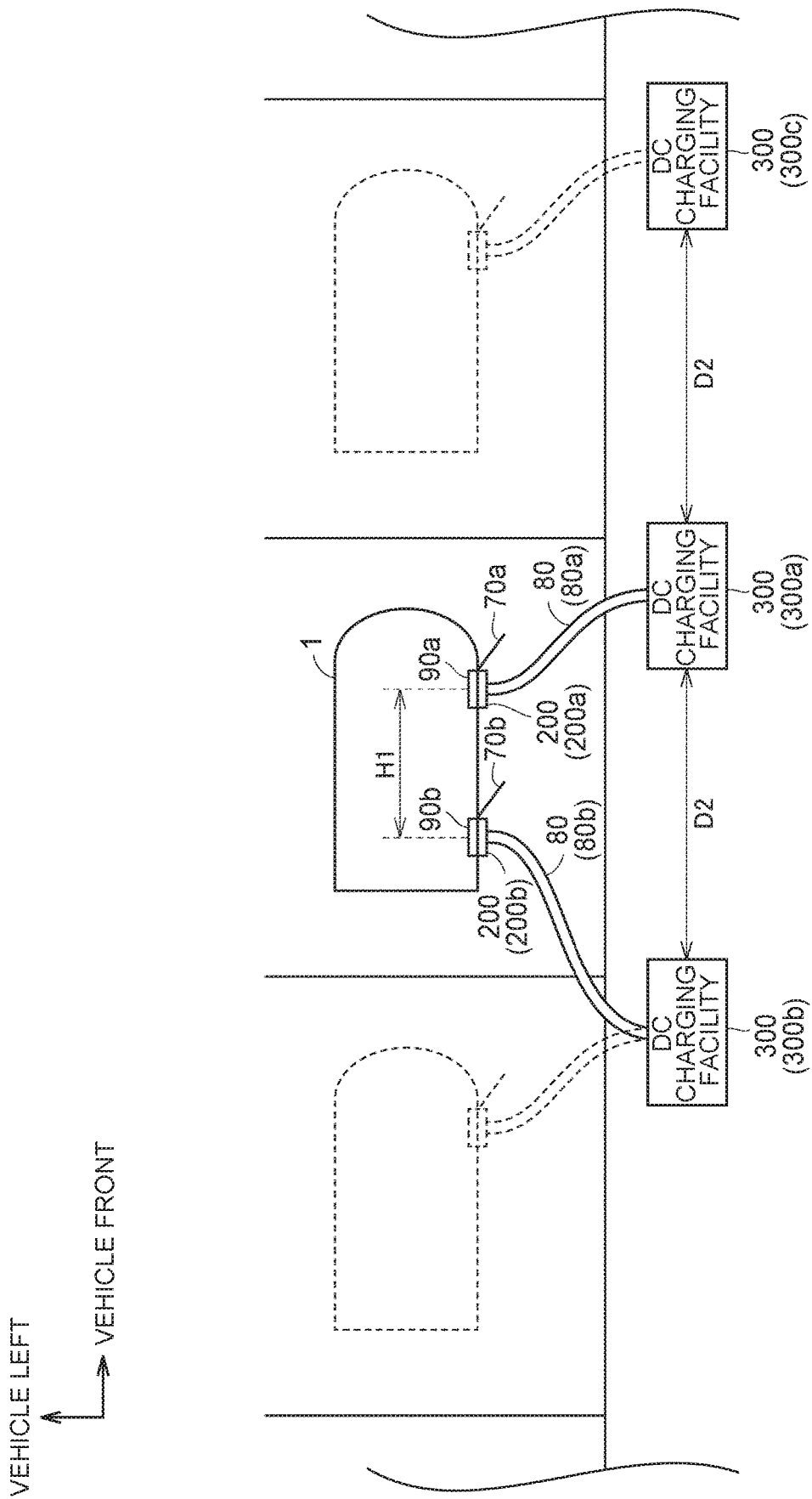

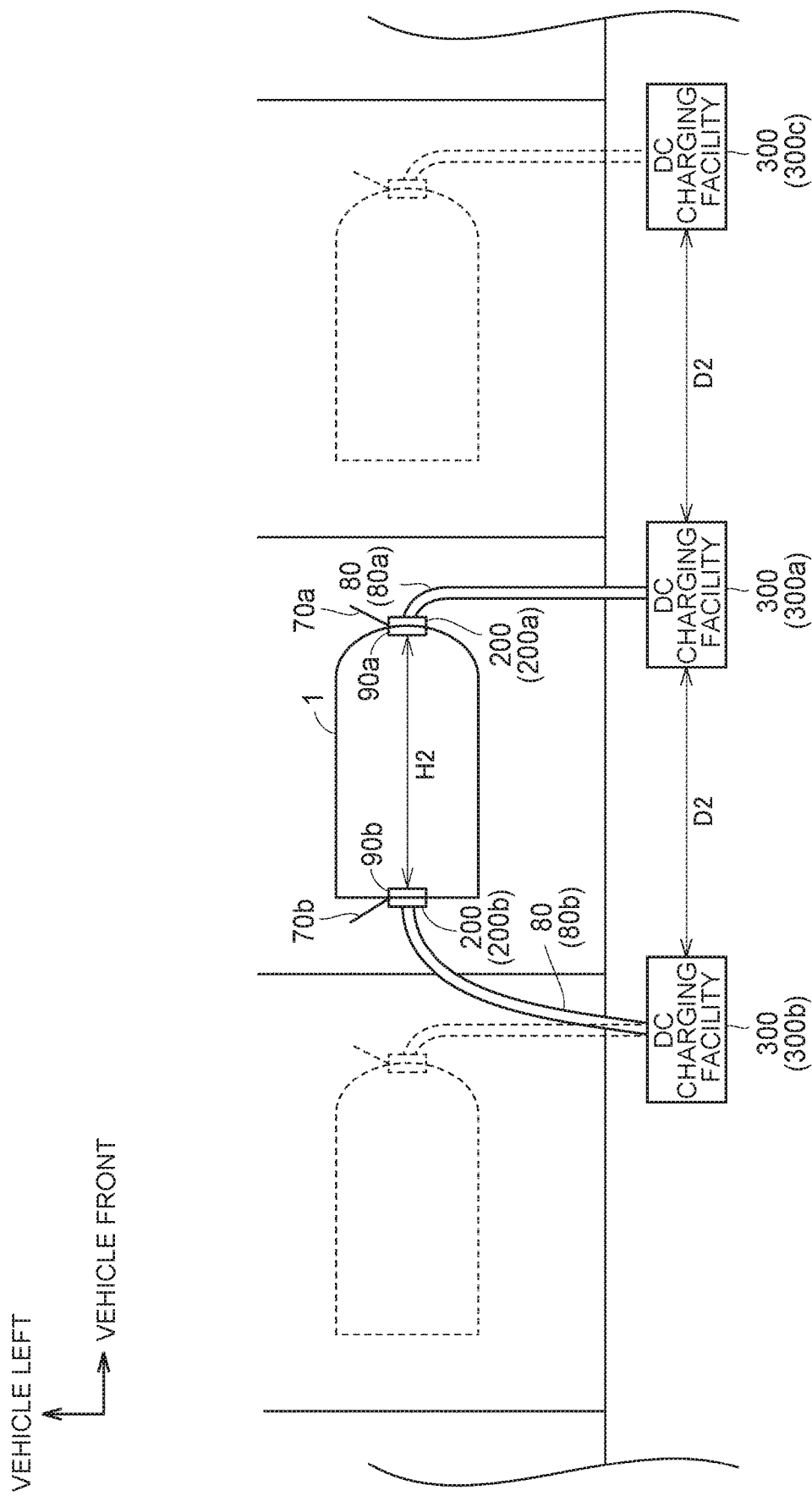

VEHICLE

CROSS-REFERENCE TO RELATED APPLICATIONS

This application claims priority to Japanese Patent Application No. 2018-008331 filed on Jan. 22, 2018, which is incorporated herein by reference in its entirety including the specification, drawings and abstract.

BACKGROUND

1. Technical Field

The present disclosure relates to a vehicle configured such that an in-vehicle battery pack can be charged by a power source outside the vehicle.

2. Description of Related Art

In recent years, in order to increase the cruising distance in terms of improving the drivability of an electrically driven vehicle such as an electric vehicle (hereinafter also simply referred to as a "vehicle"), the capacity of an in-vehicle battery pack has been increasing. Following this, the charging time required for charging the in-vehicle battery pack (hereinafter also referred to as "charging the vehicle") has also been increasing.

Japanese Unexamined Patent Application Publication No. 2010-23636 (JP 2010-23636 A) discloses a vehicle including a plurality of charging ports and a plurality of battery packs that are respectively connected to the charging ports. The vehicle is configured such that the battery packs can be simultaneously charged by respectively connecting a plurality of power sources outside the vehicle to the charging ports. Hereinafter, the power source outside the vehicle may also be referred to as an "external power source".

SUMMARY

However, in the vehicle disclosed in JP 2010-23636 A, each battery pack can only be charged via a corresponding one of the charging ports. Therefore, there is concern that even when a plurality of external power sources is provided around the vehicle, it is not possible to charge each one of the battery packs using the external power sources, resulting in a long time for charging the vehicle.

The present disclosure discloses a technique that can charge one battery pack using a plurality of external power sources.

A vehicle according to the present disclosure includes: a battery pack including a plurality of power storage units, and a switching relay configured to switch between a first state where the power storage units are electrically connected to each other, and a second state where the power storage units are electrically disconnected from each other; and a plurality of charging ports configured to be electrically connected to the power storage units, respectively.

According to the above-described configuration, the plurality of charging ports is provided to the single battery pack, and the power storage units included in the single battery pack can be electrically disconnected from each other (switching relay: second state). Consequently, the power storage units can be charged by respectively connecting a plurality of external power sources to the charging ports respectively connected to the power storage units. That is, according to the vehicle of the present disclosure, the single battery pack can be charged using the plurality of external power sources.

At least two of the charging ports may be charging ports for receiving supply of direct-current power from outside the vehicle.

In general, when charging to supply direct-current power (hereinafter also referred to as "DC charging") from an external power source is performed for charging a vehicle, the charging electric power tends to become large compared to when charging to supply alternating-current power (hereinafter also referred to as "AC charging") from an external power source is performed for charging a vehicle. Therefore, the charging current also tends to become greater in DC charging than in AC charging. When the charging current becomes large, the loss due to heat generation in a cable, a component, and so on through which the charging current flows (hereinafter also referred to as "current-carrying components") may increase. According to the above-described configuration, assuming that the charging current that charges the battery pack is constant, when the switching relay is set to the second state to charge the plurality of power storage units through the plurality of charging ports, the charging current for each power storage unit during charging can be made small. Therefore, even in DC charging, it is possible to improve the charging efficiency by suppressing heat generation of the current-carrying components. Consequently, it is possible to perform DC charging with high charging efficiency.

The charging ports may be disposed at a predetermined distance or more from each other.

In general, charging facilities (external power sources) for charging vehicles are installed such that each charging facility is given a space in which one vehicle can be parked. Even in the case of the vehicle configured such that the single battery pack can be charged using a plurality of charging facilities as described above, there is concern that when charging the vehicle using the plurality of charging facilities, charging connectors of the charging facilities cannot be connected to the charging ports due to physical (distance) limitations. According to the above-described configuration, when charging the vehicle using the plurality of charging facilities, since the charging ports are disposed at the predetermined distance or more from each other, it is assumed that the distances between the charging facilities and the charging ports become short compared to the case where the charging ports are disposed adjacent to each other. Consequently, the charging connectors of the charging facilities can be easily connected to the charging ports so that the convenience of a user is improved.

The charging ports may include a first charging port and a second charging port. The first charging port may be disposed on the right side of the vehicle, and the second charging port may be disposed on the left side of the vehicle.

There are cases where when the vehicle is parked in a parking space, charging facilities are disposed along the right-left direction of the vehicle. Even in the case of the vehicle configured such that the single battery pack can be charged using a plurality of charging facilities as described above, there is concern that when charging the vehicle using the plurality of charging facilities, charging connectors of the charging facilities cannot be connected to the charging ports due to physical (distance) limitations. According to the above-described configuration, when charging the vehicle using the plurality of charging facilities, since the first and second charging ports are respectively disposed on both the right and left sides of the vehicle, the charging connectors of the two charging facilities can be easily connected to the first and second charging ports so that the convenience of a user is improved.

The charging ports may include a first charging port and a second charging port. The first charging port and the second charging port may be disposed on one of the right side and the left side of the vehicle at a predetermined distance from each other.

There are cases where when the vehicle is parked in a parking space, charging facilities are disposed along the front-rear direction of the vehicle. Even in the case of the vehicle configured such that the single battery pack can be charged using a plurality of charging facilities as described above, there is concern that when charging the vehicle using the plurality of charging facilities, charging connectors of the charging facilities cannot be connected to the charging ports due to physical (distance) limitations. According to the above-described configuration, when charging the vehicle using the plurality of charging facilities, since the first and second charging ports are disposed on one of the right side and the left side of the vehicle at the predetermined distance from each other, the charging connectors of the two charging facilities can be easily connected to the first and second charging ports so that the convenience of a user is improved.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 6 is a diagram schematically showing a vehicle and DC charging facilities according to a first modification; and FIG. 7 is a diagram schematically showing a vehicle and DC charging facilities according to a second modification.

DETAILED DESCRIPTION OF EMBODIMENTS

Hereinafter, an embodiment will be described in detail with reference to the drawings. The same symbols will be assigned to the same or corresponding portions in the figures, thereby omitting duplicate description thereof.

Figure 1:
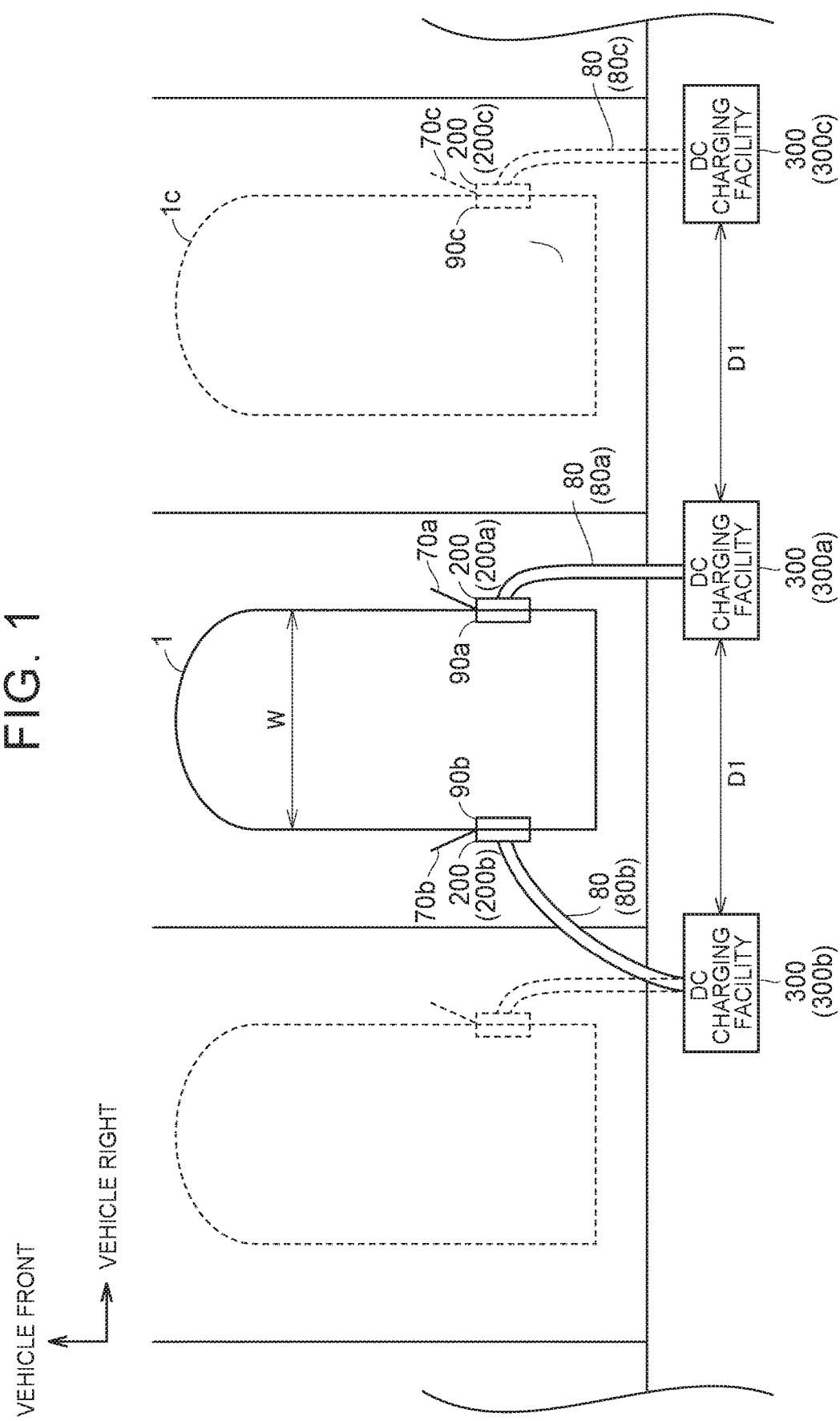
FIG. 1 is a diagram schematically showing a vehicle and DC charging facilities according to an embodiment.

FIG. 1 is a diagram schematically showing a vehicle 1 and DC charging facilities 300 according to this embodiment. The vehicle 1 is an electrically driven vehicle such as an electric vehicle or a plug-in hybrid vehicle. In this embodiment, the vehicle 1 is the plug-in hybrid vehicle by way of example.

In FIG. 1, three parking spaces are provided, and the three DC charging facilities 300a, 300b, 300c are respectively provided for the three parking spaces. The vehicle 1 is parked in one of the parking spaces for charging.

The DC charging facility 300 is a charging facility that performs charging to supply direct-current power (DC charging). The DC charging facility 300 supplies charging power (direct current) to the vehicle 1 through a charging cable 80 and a charging connector 200. The DC charging facility 300 according to this embodiment is capable of supplying large electric power (e.g. maximum output power: 160 kW). Further, when supplying the same charging power, it can change supply voltage (charging voltage). For example, when supplying the same charging power, it can change between a supply of charging power at high voltage (e.g. 800 V) and a supply of charging power at low voltage (e.g. 400 V) according to a request from the vehicle 1.

To give a specific example, when supplying, for example, charging power of 160 kW, the DC charging facility 300 supplies charging power at 800 V-200 A when a battery pack 10 (FIG. 2) of the vehicle 1 can be charged at 800 V, and supplies charging power at 400 V-400 A when the battery pack 10 of the vehicle 1 can be charged at 400 V.

The vehicle 1 includes charging lids 70a, 70b and charging ports 90a, 90b. The charging lid 70a and the charging port 90a are provided on the right side of the vehicle 1. The charging lid 70b and the charging port 90b are provided on the left side of the vehicle 1.

The charging port 90a is covered with the charging lid 70a when the vehicle 1 used, while when the vehicle 1 is charged, the charging lid 70a is opened and the charging connector 200a of the DC charging facility 300a is connected to the charging port 90a.

The charging port 90b is covered with the charging lid 70b when the vehicle 1 used, while when the vehicle 1 is charged, the charging lid 70b is opened and the charging connector 200b of the DC charging facility 300b is connected to the charging port 90b.

When charging an ordinary vehicle, for example, as indicated by dotted lines in FIG. 1, charging is performed for a vehicle 1c using the single DC charging facility 300c. In this case, a charging lid 70c of the vehicle 1c is opened and the charging connector 200c of the charging cable 80c is connected to a charging port 90c of the vehicle 1c, so that the vehicle 1c is charged.

As indicated by solid lines in FIG. 1, the vehicle 1 according to this embodiment includes the charging port 90a disposed on the right side of the vehicle 1 and the charging port 90b disposed on the left side of the vehicle 1. Charging is performed for the single vehicle 1 using the two DC charging facilities 300a, 300b.

Figure 2:
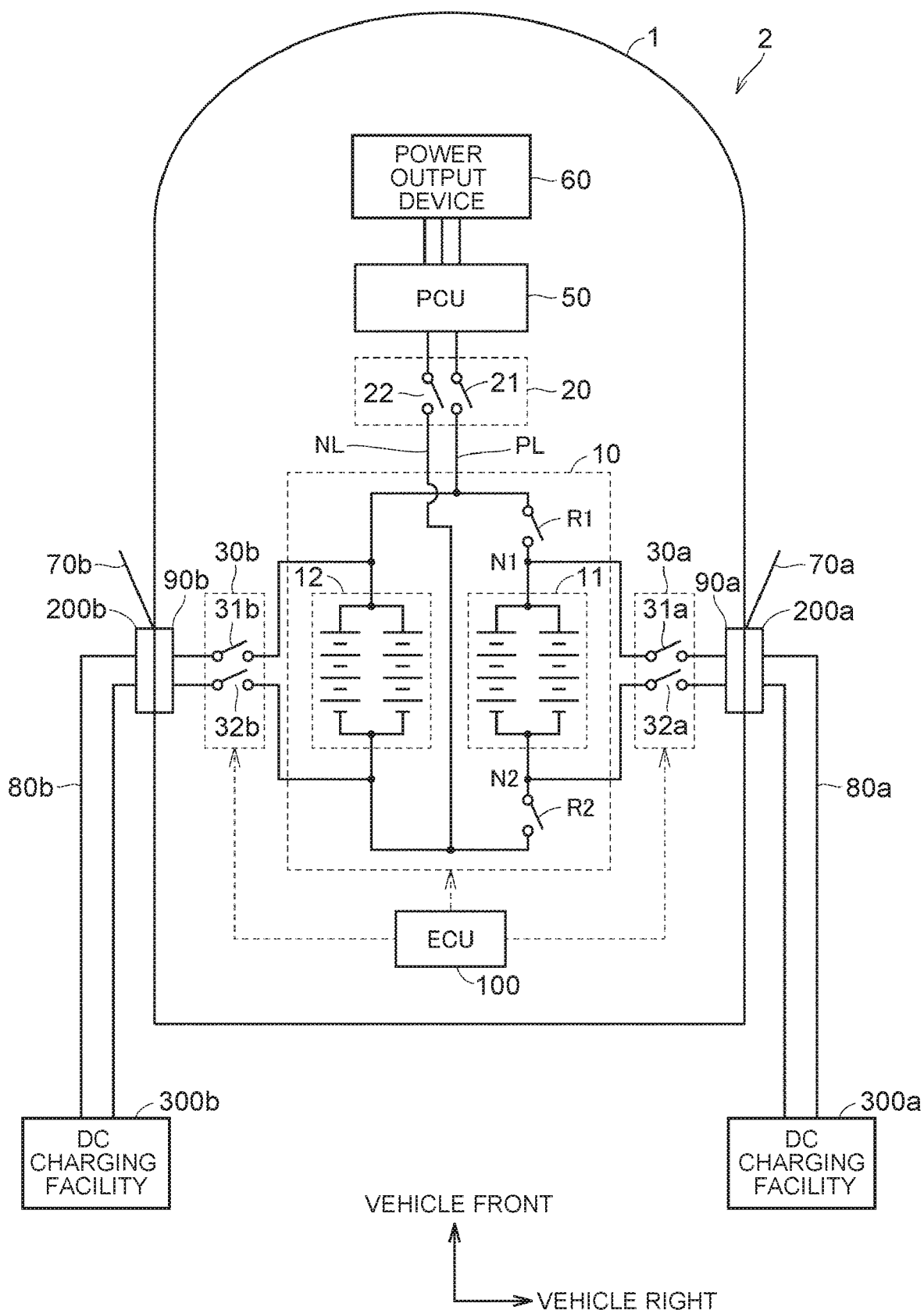
FIG. 2 is a diagram showing in detail the configuration of the vehicle according to the embodiment.

FIG. 2 is a diagram showing in detail the configuration of the vehicle 1 according to this embodiment. The vehicle 1 includes the battery pack 10, a power control unit (hereinafter also referred to as a "PCU") 50, a power output device 60, the charging lids 70a, 70b, the charging ports 90a, 90b, an electronic control unit (ECU) 100, a main relay device 20, and charging relay devices 30a, 30b.

The battery pack 10 includes two battery stacks 11, 12 and switching relays R1, R2. A plurality of batteries is stacked in the battery stack 11. The battery is a rechargeable direct-current power source and is, for example, a nickel-hydrogen secondary battery or a lithium-ion secondary battery. The battery may be an all-solid-state battery including a solid electrolyte between positive and negative electrodes. The battery stack 11 stores electric power that is supplied from a power source outside the vehicle 1 and input through the charging port 90a, and electric power that is generated by the power output device 60. This also applies to the battery stack 12. In this embodiment, a description will be given of an example where the two battery stacks 11, 12 are included in the battery pack 10, but the number of battery stacks included in the battery pack 10 is not limited to two. The number of battery stacks included in the battery pack 10 may be three or more. Further, the battery stack is not limited to the configuration where a plurality of batteries is stacked, and may be composed of a single battery. Alternatively, a large-capacity capacitor may be employed as each of the battery stacks 11, 12.

The switching relays R1, R2 are configured such that each can be individually controlled to the on or off state. The switching relay R1 is provided between a main relay 21 of the main relay device 20 and a positive electrode terminal of the battery stack 11. The switching relay R2 is provided between a main relay 22 of the main relay device 20 and a negative electrode terminal of the battery stack 11. The switching relays R1, R2 may alternatively be configured such that the on-off states thereof are controlled jointly with each other.

By setting the switching relays R1, R2 to a first state where the switching relays R1, R2 are both in the on state, the battery stack 11 and the battery stack 12 are electrically connected to each other. By setting the switching relays R1, R2 to a second state where the switching relays R1, R2 are both in the off state, the battery stack 11 and the battery stack 12 are electrically disconnected from each other. Details of the switching relays R1, R2 in the first state and in the second state will be described later.

The PCU 50 collectively shows power conversion devices for receiving electric power from the battery pack 10 and driving the power output device 60. For example, the PCU 50 includes an inverter for driving a motor included in the power output device 60, a converter for boosting voltage of electric power output from the battery pack 10 and supplying the boosted electric power to the inverter, and so on.

The power output device 60 collectively shows devices for driving drive wheels (not shown). For example, the power output device 60 includes a motor, an engine, and so on for driving the drive wheels. When the motor driving the drive wheels is operated in a regenerative mode, for example, during braking of the vehicle 1, the power output device 60 generates electric power and outputs the generated electric power to the PCU 50. Hereinafter, the PCU 50, the power output device 60, and the drive wheels may also be collectively referred to as a "drive unit".

The main relay device 20 is provided between the battery pack 10 and the drive unit. The main relay device 20 includes the main relay 21 and the main relay 22. The main relay 21 and the main relay 22 are respectively connected to a positive electrode line PL and a negative electrode line NL.

When the main relays 21, 22 are in the off state, it is not possible to supply electric power from the battery pack 10 to the drive unit so that the vehicle 1 cannot perform EV traveling in which the vehicle 1 travels only with driving force of the motor. When the main relays 21, 22 are in the on state, it is possible to supply electric power from the battery pack 10 to the drive unit so that the vehicle 1 can perform EV traveling.

The charging relay device 30a is provided between the battery pack 10 and the charging port 90a. The charging relay device 30a includes a charging relay 31a and a charging relay 32a. The charging relay 31a has a first end connected to a node N1 and a second end connected to the charging port 90a. The charging relay 32a has a first end connected to a node N2 and a second end connected to the charging port 90a. The node N1 is provided between the switching relay R1 and the positive electrode terminal of the battery stack 11. The node N2 is provided between the switching relay R2 and the negative electrode terminal of the battery stack 11. The charging relays 31a, 32a are set to the on state when the vehicle 1 is charged by the DC charging facility 300a.

The charging relay device 30b is provided between the battery pack 10 and the charging port 90b. The charging relay device 30b includes a charging relay 31b and a charging relay 32b. The charging relay 31b has a first end connected to a positive electrode terminal of the battery stack 12 and a second end connected to the charging port 90b. The charging relay 32b has a first end connected to a negative electrode terminal of the battery stack 12 and a second end connected to the charging port 90b. The charging relays 31b, 32b are set to the on state when the vehicle 1 is charged by the DC charging facility 300b.

The ECU 100 includes a central processing unit (CPU), a memory, and an input-output buffer, none of which are shown. The ECU 100 receives signals from sensors and so on and outputs control signals to devices, thereby controlling the devices. These controls are not limited to processing by software and may alternatively be performed by building dedicated hardware (electronic circuit).

Specifically, the ECU 100 controls charging of the battery pack 10. The ECU 100 controls the on-off states of the switching relays R1, R2 included in the battery pack 10 so as to set the switching relays R1, R2 to the first state or the second state. Further, the ECU 100 controls the on-off states of the main relays 21, 22 included in the main relay device 20. Further, the ECU 100 controls the on-off states of the charging relays 31a, 32a included in the charging relay device 30a. Further, the ECU 100 controls the on-off states of the charging relays 31b, 32b included in the charging relay device 30b.

Figure 3:
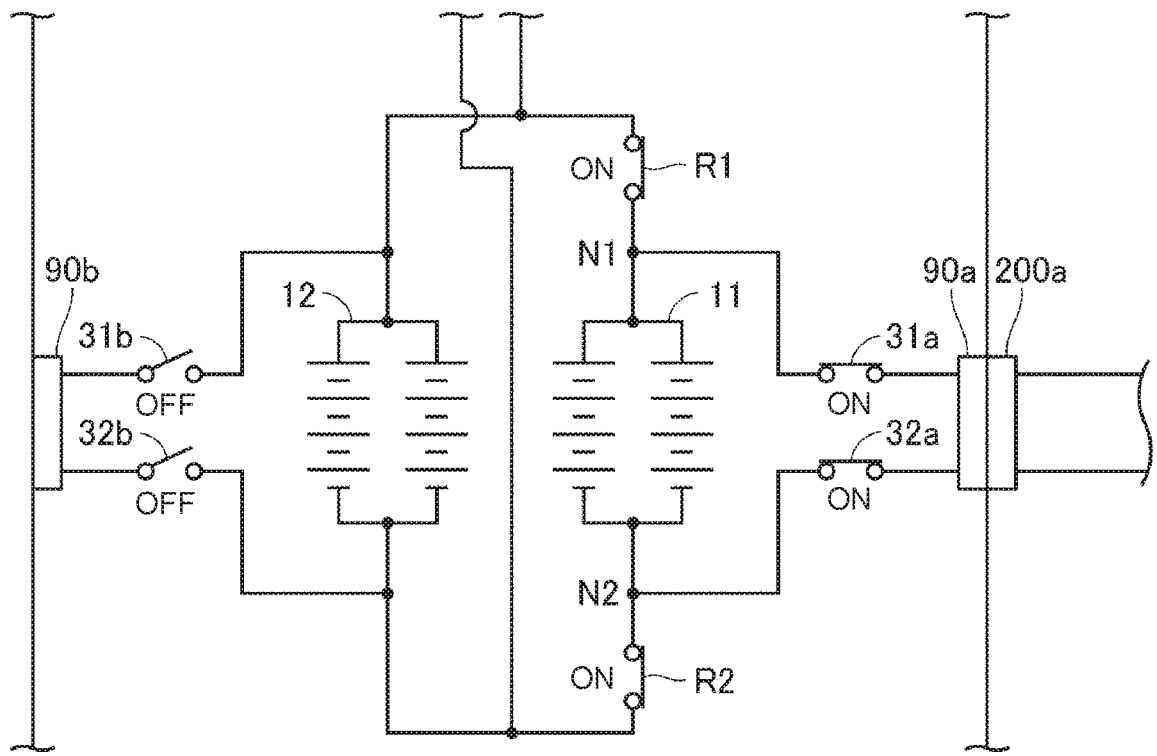
FIG. 3 is a diagram schematically showing a battery pack when switching relays are in a first state.

FIG. 3 is a diagram schematically showing the battery pack 10 when the switching relays R1, R2 are in the first state. When the switching relays R1, R2 are both in the on state, the battery stack 11 and the battery stack 12 are electrically connected to each other. In this embodiment, a description will be given of an example where the battery stacks 11, 12 are connected in parallel when the switching relays R1, R2 are in the first state, but not limited thereto. For example, a relay that can perform switching between series connection and parallel connection of the battery stacks 11, 12 may further be included. In this case, it may be configured that the battery stacks 11, 12 are connected in series when the switching relays R1, R2 are in the first state.

In the state where the battery stack 11 and the battery stack 12 are electrically connected to each other, the charging connector 200a of the DC charging facility 300a is connected to the charging port 90a. Then, by setting the charging relays 31a, 32a to the on state and setting the charging relays 31b, 32b to the off state, the battery pack 10 (the battery stacks 11, 12) can be charged by the DC charging facility 300a.

Although not shown, the battery pack 10 may alternatively be charged using the DC charging facility 300b. In this case, the charging connector 200b of the DC charging facility 300b is connected to the charging port 90b. Then, by setting the charging relays 31a, 32a to the off state and setting the charging relays 31b, 32b to the on state, the battery pack 10 (the battery stacks 11, 12) can be charged by the DC charging facility 300b.

Figure 4:
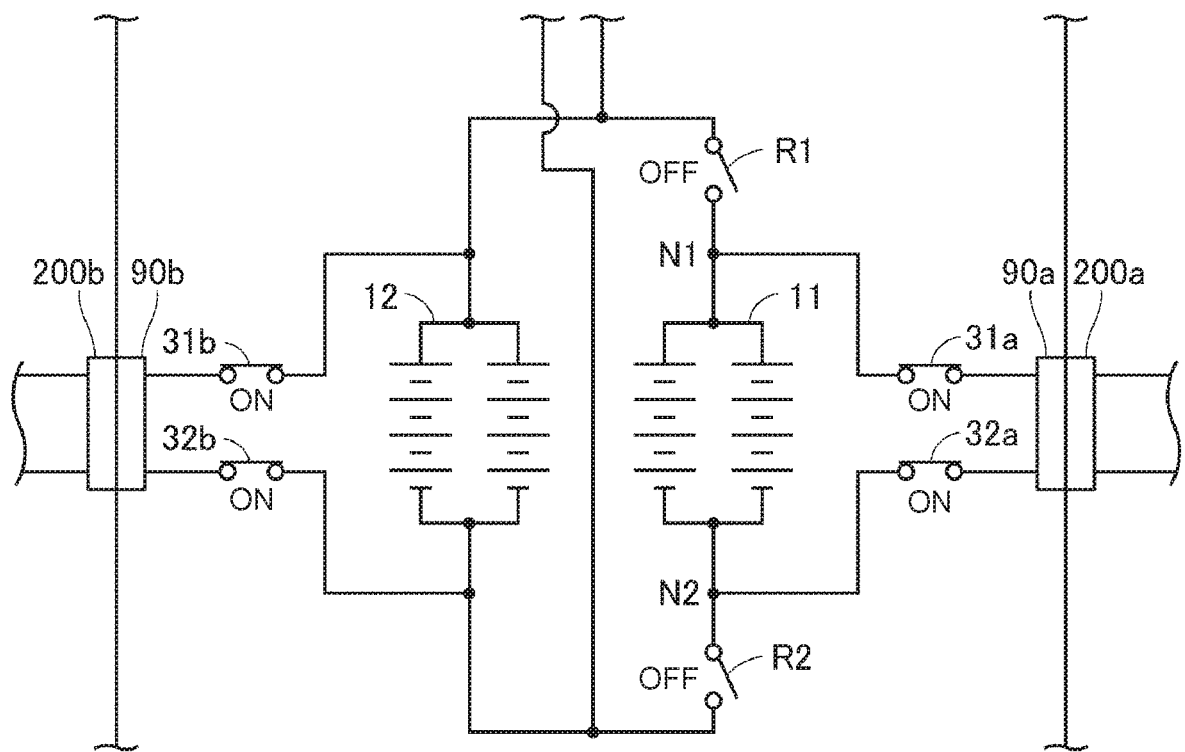
FIG. 4 is a diagram schematically showing the battery pack when the switching relays are in a second state.

FIG. 4 is a diagram schematically showing the battery pack 10 when the switching relays R1, R2 are in the second state. When the switching relays R1, R2 are both in the off state, the battery stack 11 and the battery stack 12 are electrically disconnected from each other.

In the state where the battery stack 11 and the battery stack 12 are electrically disconnected from each other, the charging connector 200a of the DC charging facility 300a is connected to the charging port 90a and further the charging connector 200b of the DC charging facility 300b is connected to the charging port 90b. Then, by setting the charging relays 31a, 32a and the charging relays 31b, 32b to the on state, the battery stack 11 can be charged by the DC charging facility 300a and the battery stack 12 can be charged by the DC charging facility 300b.

In this way, the battery pack 10 can be charged using the two DC charging facilities 300a, 300b. Since the battery stack 11 and the battery stack 12 are simultaneously charged by the two DC charging facilities 300a, 300b, it is possible to shorten the time required for charging the battery pack 10. Further, assuming that the charging current that charges the battery pack 10 is constant, since the battery stack 11 and the battery stack 12 are respectively charged through different charging paths, the charging current that flows through each charging path becomes smaller so that the loss due to heat generation of current-carrying components is suppressed to improve the charging efficiency. Further, since the battery stacks 11, 12 included in the single battery pack 10 can be charged in a divided manner, wiring for supplying electric power from the battery pack 10 to the drive unit of the vehicle 1 can be simplified compared to the case where a plurality of battery packs is installed in the vehicle 1. Further, since it is also possible to charge the battery pack 10 (the battery stacks 11, 12) through one of the charging ports (e.g. the charging port 90a), it is possible to perform efficient charging depending on the situation of the DC charging facilities 300 that can be used, or the like.

In this embodiment, as shown in FIG. 1, when the vehicle 1 is parked in the parking space, the DC charging facilities 300a, 300b, 300c are disposed at a distance D1 from the adjacent DC charging facility in the right-left direction of the vehicle 1. Even in the case of the vehicle 1 configured such that the single battery pack 10 can be charged using the two DC charging facilities 300a, 300b as described above, there is concern that the charging connectors 200a, 200b of the DC charging facilities 300a, 300b cannot be connected to both of the charging ports 90a, 90b due to physical (distance) limitations depending on the positions where the charging ports 90a, 90b are disposed. For example, in the case where the charging port 90a and the charging port 90b are disposed adjacent to each other on the right side of the vehicle 1, it can be assumed that while the charging connector 200a of the DC charging facility 300a can be connected to the charging port 90a, the charging connector 200b of the DC charging facility 300b cannot be connected to the charging port 90b due to insufficient length of the charging cable 80b.

In view of this, in the vehicle 1 according to this embodiment, the charging ports 90a, 90b are respectively disposed on the right side of the vehicle 1 and on the left side of the vehicle 1. Consequently, the charging connectors 200a, 200b of the DC charging facilities 300a, 300b can be easily connected to the charging ports 90a, 90b of the vehicle 1, respectively. Specifically, the charging port 90a and the charging port 90b are respectively disposed on the right side and the left side of the vehicle 1 at a distance W from each other. Therefore, when the vehicle 1 is parked in the parking space, the distance between the DC charging facility 300a and the charging port 90a becomes short. Accordingly, an operation to connect the charging connector 200a of the charging cable 80a of the DC charging facility 300a to the charging port 90a is facilitated to improve convenience of a user. Likewise, since the distance between the DC charging facility 300b and the charging port 90b also becomes short, an operation to connect the charging connector 200b of the charging cable 80b of the DC charging facility 300b to the charging port 90b is facilitated to improve convenience of the user.

In particular, since the DC charging facility 300 is possibly configured to supply large electric power (e.g. 160 kW) to the vehicle 1, the charging cable 80 used for DC charging is often large in diameter and not easily bent compared to a charging cable used in an AC charging facility that performs charging to supply alternating-current power (AC charging). Therefore, the convenience of the user is improved particularly in DC charging.

Figure 5:
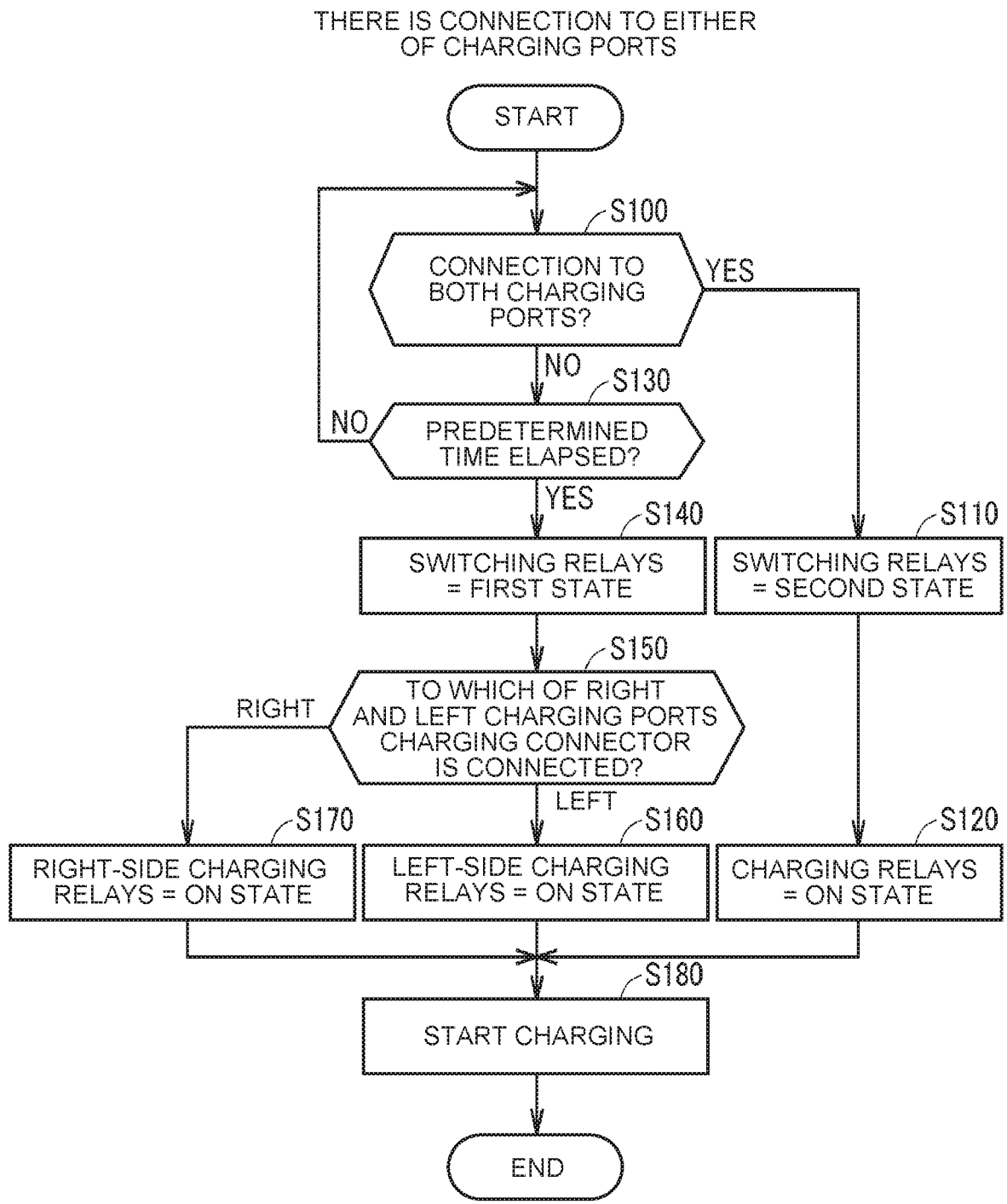
FIG. 5 is a flowchart showing processing to be performed by an ECU when a charging connector is connected to a charging port.

FIG. 5 is a flowchart showing processing to be performed by the ECU 100 when the charging connector is connected to the charging port. This processing is started in the ECU 100 when the charging connector 200a, 200b is connected to either of the charging ports 90a, 90b. Respective steps of the flowchart shown in FIG. 5 are realized by software processing by the ECU 100, but part of them may be realized by hardware (electric circuit) formed in the ECU 100.

When the charging connector 200a, 200b is connected to either of the charging ports 90a, 90b, the ECU 100 starts processing. In the following description of FIG. 5, a description will be given of an example where the charging connector 200a is connected to the charging port 90a.

The ECU 100 determines whether or not the charging connectors 200a, 200b are respectively connected to the charging ports 90a, 90b (step 100; hereinafter "step" will be abbreviated as "S"). In other words, the ECU 100 determines whether or not the charging connector 200b is also connected to the charging port 90b.

When the ECU 100 has determined that the charging connectors 200a, 200b are not connected to both of the charging ports 90a, 90b (NO at S100), the ECU 100 determines whether or not a predetermined time has elapsed (S130). When the ECU 100 has determined that the predetermined time has not elapsed (NO at S130), the ECU 100 returns the processing to S100.

The predetermined time is a time that is arbitrarily set. For example, the predetermined time is set taking into account a time that may be required until connecting the charging connector 200b to the charging port 90b after connecting the charging connector 200a to the charging port 90a. When charging the battery pack 10 using the two DC charging facilities 300a, 300b, a situation is assumed that the charging connector 200a is connected to the charging port 90a and then the charging connector 200b is connected to the other charging port 90b. Therefore, by providing the predetermined time, the ECU 100 determines whether the battery pack 10 is charged using the single DC charging facility 300a or using the two DC charging facilities 300a, 300b.

When the ECU 100 has determined that the charging connector 200b is connected to the charging port 90b within the predetermined time, i.e. the charging connectors 200a, 200b are respectively connected to the charging ports 90a, 90b (YES at S100), the ECU 100 sets the switching relays R1, R2 to the second state (S110). In other words, the ECU 100 electrically disconnects the battery stacks 11, 12 from each other.

The ECU 100 sets the charging relays 31a, 32a of the charging relay device 30a and the charging relays 31b, 32b of the charging relay device 30b to the on state (S120) to start charging (S180). Consequently, the battery stack 11 is charged by the DC charging facility 300a, and the battery stack 12 is charged by the DC charging facility 300b.

Therefore, it is possible to shorten the time required for charging the battery pack 10. Further, assuming that the charging current that charges the battery pack 10 is constant, since the charging path is divided, the charging current that flows through each charging path can be made small so that it is possible to suppress heat generation of the current-carrying components to improve the charging efficiency.

When the ECU 100 has determined at S130 that the predetermined time has elapsed, the ECU 100 sets the switching relays R1, R2 to the first state (S140). In other words, the ECU 100 electrically connects the battery stacks 11, 12 to each other.

Then, the ECU 100 determines to which of the charging ports 90a, 90b the charging connector is connected (S150). When the ECU 100 has determined that the charging connector 200a is connected to the charging port 90a (RIGHT at S150), the ECU 100 sets the charging relays 31a, 32a of the charging relay device 30a to the on state (S170) to start charging (S180).

On the other hand, when the ECU 100 has determined that the charging connector 200b is connected to the charging port 90b (LEFT at S150), the ECU 100 sets the charging relays 31b, 32b of the charging relay device 30b to the on state (S160) to start charging (S180).

As described above, the vehicle 1 according to this embodiment includes the charging ports 90a, 90b and the battery pack 10. The battery pack 10 includes the battery stacks 11, 12 respectively connected to the charging ports 90a, 90b via the charging relay devices 30a, 30b, and the switching relays R1, R2 that can switch to the first state where the battery stack 11 and the battery stack 12 are electrically connected to each other, or to the second state where the battery stack 11 and the battery stack 12 are electrically disconnected from each other.

When the vehicle 1 is charged through both of the charging ports 90a, 90b, the switching relays R1, R2 are switched to the second state. Consequently, the battery stack 11 is charged by the DC charging facility 300a, and the battery stack 12 is charged by the DC charging facility 300b. Since the battery stack 11 and the battery stack 12 are simultaneously charged by the different DC charging facilities 300a, 300b, it is possible to shorten the time required for charging the battery pack 10. Further, assuming that the charging current that charges the battery pack 10 is constant, since the battery stack 11 and the battery stack 12 are respectively charged through different charging paths, the charging current that flows through each charging path becomes smaller so that the loss due to heat generation of the current-carrying components is suppressed to improve the charging efficiency.

When the vehicle 1 is charged through one of the charging ports 90a, 90b, the switching relays R1, R2 are switched to the first state. Consequently, it is also possible to charge both of the battery stacks 11, 12 by the single DC charging facility 300.

When the vehicle 1 is used, the switching relays R1, R2 are switched to the first state. Consequently, it is possible to use the battery pack 10 as a single large-capacity battery pack.

By making it possible to charge the battery stacks 11, 12 included in the single battery pack 10 in a divided manner, the single battery pack 10 can be increased in capacity so that it is not necessary to install a plurality of battery packs. When the plurality of battery packs is installed, wiring for supplying electric power from the respective battery packs to the drive unit of the vehicle 1 is required, and therefore, by making it possible to increase the capacity of the single battery pack 10, wiring for supplying electric power from the battery pack 10 to the drive unit of the vehicle 1 can be simplified.

First Modification

In the embodiment, the description has been given of the example where the charging port 90a is disposed on the right side of the vehicle 1 and the charging port 90b is disposed on the left side of the vehicle 1. However, the positions where the charging ports 90a, 90b are disposed are not limited thereto. For example, the charging ports 90a, 90b may both be disposed on the right side of the vehicle 1 at a predetermined distance from each other, or the charging ports 90a, 90b may both be disposed on the left side of the vehicle 1 at a predetermined distance from each other. In the first modification, a description will be given of an example where the charging ports 90a, 90b are both disposed on the right side of the vehicle 1 at a predetermined distance from each other.

FIG. 6 is a diagram schematically showing the vehicle 1 and the DC charging facilities 300 according to the first modification. In FIG. 6, three parking spaces are provided, and the DC charging facilities 300a, 300b, 300c are respectively provided for the parking spaces. The vehicle 1 is parallel-parked in the parking space so that charging of the vehicle 1 is performed. In the first modification, as shown in FIG. 6, when the vehicle 1 is parked in the parking space, the DC charging facilities 300a, 300b, 300c are disposed at a distance D2 from the adjacent DC charging facility in the front-rear direction of the vehicle 1. In this case, for example, when the charging ports 90a, 90b are respectively disposed at the front on the right side of the vehicle 1 and at the rear on the right side of the vehicle 1, the charging connectors 200a, 200b of the DC charging facilities 300a, 300b can be easily connected to the charging ports 90a, 90b of the vehicle 1, respectively.

Specifically, the charging port 90a and the charging port 90b are respectively disposed at the front on the right side of the vehicle 1 and at the rear on the right side of the vehicle 1 at a distance H1 from each other. Consequently, when the vehicle 1 is parked in the parking space, the distance between the DC charging facility 300a and the charging port 90a becomes short. Therefore, an operation to connect the charging connector 200a of the charging cable 80a of the DC charging facility 300a to the charging port 90a is facilitated to improve convenience of the user. Likewise, since the distance between the DC charging facility 300b and the charging port 90b also becomes short, an operation to connect the charging connector 200b of the charging cable 80b of the DC charging facility 300b to the charging port 90b is facilitated to improve convenience of the user.

Second Modification

In the embodiment, the description has been given of the example where the charging port 90a is disposed on the right side of the vehicle 1 and the charging port 90b is disposed on the left side of the vehicle 1. In the first modification, the description has been given of the example where the charging port 90a is disposed at the front on the right side of the vehicle 1 and the charging port 90b is disposed at the rear on the right side of the vehicle 1. Alternatively, the charging ports 90a, 90b may be respectively disposed at the front and rear of the vehicle 1. For example, the charging port 90a may be disposed at the front of the vehicle 1 and the charging port 90b may be disposed at the rear of the vehicle 1.

FIG. 7 is a diagram schematically showing the vehicle 1 and the DC charging facilities 300 according to the second modification. Also in the second modification, like in the first modification, the vehicle 1 is parallel-parked in the parking space so that charging of the vehicle 1 is performed. Also in the second modification, as shown in FIG. 7, when the vehicle 1 is parked in the parking space, the DC charging facilities 300a, 300b, 300c are disposed at the distance D2 from the adjacent DC charging facility in the front-rear direction of the vehicle 1. In this case, even when the charging ports 90a, 90b are respectively disposed at the front and rear of the vehicle 1, the charging connectors 200a, 200b of the DC charging facilities 300a, 300b can be easily connected to the charging ports 90a, 90b of the vehicle 1, respectively.

Specifically, the charging port 90a and the charging port 90b are respectively disposed at the front of the vehicle 1 and at the rear of the vehicle 1 at a distance H2 from each other. Consequently, when the vehicle 1 is parked in the parking space, the distance between the DC charging facility 300a and the charging port 90a becomes short. Therefore, an operation to connect the charging connector 200a of the charging cable 80a of the DC charging facility 300a to the charging port 90a is facilitated to improve convenience of the user. Likewise, since the distance between the DC charging facility 300b and the charging port 90b also becomes short, an operation to connect the charging connector 200b of the charging cable 80b of the DC charging facility 300b to the charging port 90b is facilitated to improve convenience of the user.

Third Modification

In the embodiment, the first modification, and the second modification, the description has been given of the example where the vehicle 1 includes the two charging ports 90a, 90b, but the number of charging ports may be three or more. When the vehicle 1 includes three or more charging ports, the intervals between the charging ports (the distances between the charging ports) are not necessarily equal to each other.

For example, in the embodiment, the charging port 90a and the charging port 90b are disposed at the distance W from each other. In this case, for example, when the vehicle 1 further includes a charging port 90d disposed at the front on the right side of the vehicle 1, the distance between the charging port 90a and the charging port 90d is not necessarily the distance W. For example, the distance may be a distance W1 greater than the distance W or may be a distance W2 shorter than the distance W.

Even in the above case, with the three charging ports disposed at different positions, operations to connect the charging connectors to the charging ports are facilitated to improve convenience of the user.

Other Modifications

In the embodiment, the first modification, the second modification, and the third modification, the description has been given of the example where the DC charging facility 300 is the facility that can supply large electric power (e.g. maximum output power: 160 kW), but not limited thereto. For example, it may be an ordinary DC charging facility (e.g. maximum output power: 50 kW) that is not capable of supplying large electric power.

In recent years, the conventional ordinary DC charging facilities have been shifting to the large-power DC charging facilities 300. Even in this situation, by making it possible to charge the battery stacks 11, 12 included in the battery pack 10 in a divided manner, the battery pack 10 can be charged by the two ordinary DC charging facilities so that it is possible to shorten the time required for charging the battery pack 10 compared to the case where the battery pack 10 is charged by the single ordinary DC charging facility. Therefore, it is possible to effectively utilize the existing ordinary DC charging facilities.

In the embodiment, the first modification, the second modification, and the third modification, the description has been given of the example where the vehicle 1 is DC-charged. However, the present disclosure can also be applied to AC charging.

The embodiments disclosed herein are for illustrative purposes only and should not be construed as being limitative in any aspect. The scope of the present disclosure is defined by the claims, not by the description of the embodiments described above, and is intended to include all changes within the meaning and range of equivalents of the claims.

What is claimed is:

1. A vehicle comprising:
   a drive unit;
   a battery pack including
      a plurality of power storage units, and
      a switching relay configured to switch between a first state and a second state, the first state being a state where the power storage units are electrically connected to each other, and the second state being a state where the power storage units are electrically disconnected from each other;
   a plurality of charging ports configured to be electrically connected to the power storage units, respectively; and
   a main relay device provided between the battery pack and the drive unit, the main relay device including a first main relay and a second main relay, the main relay being connected to the battery pack by a positive electrode line which is connected to the first main relay, and a negative electrode line which is connected to the second main relay.

2. The vehicle according to claim 1, wherein at least two of the charging ports are charging ports for receiving supply of direct-current power from outside the vehicle.

3. The vehicle according to claim 1, wherein the charging ports are disposed at a predetermined distance or more from each other.

4. The vehicle according to claim 1, wherein:
   the charging ports include a first charging port and a second charging port; and
   the first charging port is disposed on a right side of the vehicle, and the second charging port is disposed on a left side of the vehicle.

5. The vehicle according to claim 1, wherein:
   the charging ports include a first charging port and a second charging port; and
   the first charging port and the second charging port are disposed on one of a right side and a left side of the vehicle at a predetermined distance from each other.

6. A vehicle comprising:
   a battery pack including
      a first power storage unit,
      a second power storage unit, and
      a switching relay configured to switch between a first state and a second state, the first state being a state where the first power storage unit and the second power storage unit are electrically connected to each other, and the second state being a state where the first power storage unit and the second power storage unit are electrically disconnected from each other;
   a first charging port configured to be electrically connected to the first power storage unit;

a second charging port configured to be electrically connected to the second power storage unit; and
an electronic control unit configured to detect whether the first charging port is connected to the first charging connector of a charging facility and to detect whether the second charging port is connected a second charging connector of the charging facility,
the electronic control unit is configured to switch the switching relay to the second state when it is detected that the first charging port is connected to the first charging connector and that the second charging port is connected to the second charging connector after a predetermined time has elapsed, and
the electronic control unit is configured to switch the switching relay to the first state when it is detected that only one of the first charging port is connected to the first charging connector or the second charging port is connected to the second charging connector after the predetermined time has elapsed.

7. The vehicle according to claim 6 further comprising:
a drive unit; and
a main relay device provided between the battery pack and the drive unit, the main relay device including a first main relay and a second main relay, the main relay being connected to the battery pack by a positive electrode line which is connected to the first main relay, and a negative electrode line which is connected to the second main relay.

8. The vehicle according to claim 6, wherein the first charging port and the second charging port are charging ports for receiving supply of direct-current power from outside the vehicle.

9. The vehicle according to claim 6, wherein the first charging port and the second charging port are disposed at a predetermined distance or more from each other.

10. The vehicle according to claim 6, wherein:
the first charging port is disposed on a first side of the vehicle, and the second charging port is disposed on an opposite second side of the vehicle.

11. The vehicle according to claim 6, wherein:
the first charging port and the second charging port are disposed on one of a first side and an opposite second side of the vehicle at a predetermined distance from each other.

* * * * *